H. L. REYNOLDS.
CREAM REMOVER FOR MILK BOTTLES.
APPLICATION FILED JUNE 2, 1913.

1,083,560.

Patented Jan. 6, 1914
2 SHEETS—SHEET 1.

INVENTOR.
Henry L. Reynolds.

WITNESSES

H. L. REYNOLDS.
CREAM REMOVER FOR MILK BOTTLES.
APPLICATION FILED JUNE 2, 1913.

1,083,560.

Patented Jan. 6, 1914.
2 SHEETS—SHEET 2.

WITNESSES,

INVENTOR
Henry L. Reynolds.

UNITED STATES PATENT OFFICE.

HENRY L. REYNOLDS, OF SEATTLE, WASHINGTON.

CREAM-REMOVER FOR MILK-BOTTLES.

1,083,560.  Specification of Letters Patent.  Patented Jan. 6, 1914.

Application filed June 2, 1913. Serial No. 771,324.

*To all whom it may concern:*

Be it known that I, HENRY L. REYNOLDS, a citizen of the United States, and resident of the city of Seattle, King county, Washington, have invented certain new and useful Improvements in Cream-Removers for Milk-Bottles, of which the following is a specification.

My invention relates to cream removers for bottled milk, and comprises a novel construction for removing the cream from the type of bottle which is very generally used for delivering milk, whereby the cream may be removed without, at the same time, getting a large percentage of milk.

The object of my invention is to make possible the removal of the cream from such bottles without having to dilute it with milk.

The scope of my invention and of what it consists, will be seen from a study of the following specification, and the same will be particularly defined in the claims which terminate the specification.

In the accompanying drawings I have shown a number of modified constructions which embody my invention, the same containing the constructions which are now preferred by me.

Figure 2:
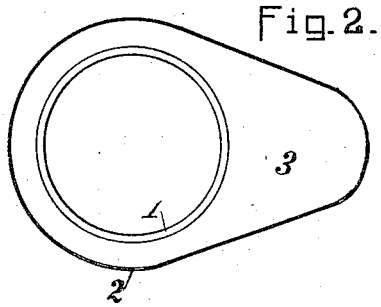
Figure 1:
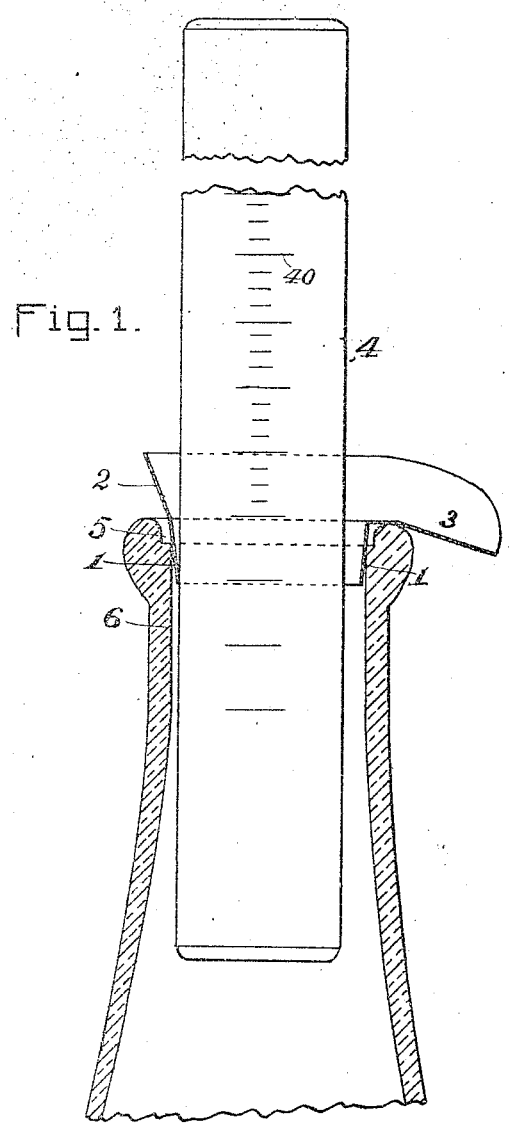
Figure 3:
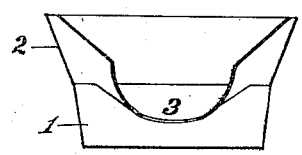
Figure 4:
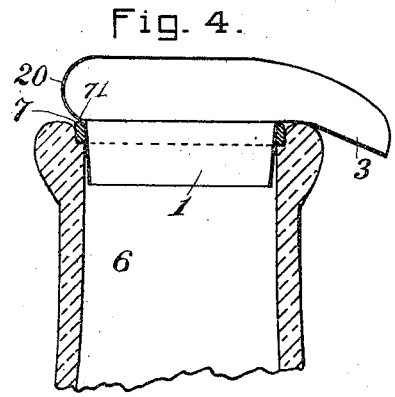
Figure 6:
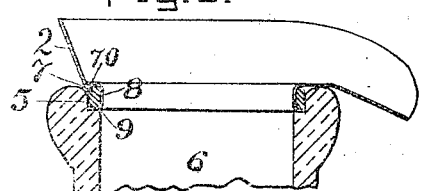
Figure 5:
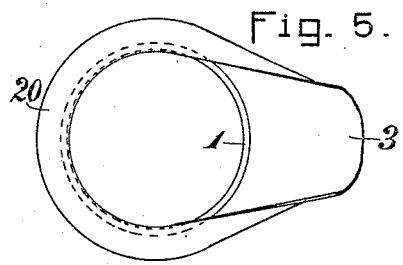
Figure 7:
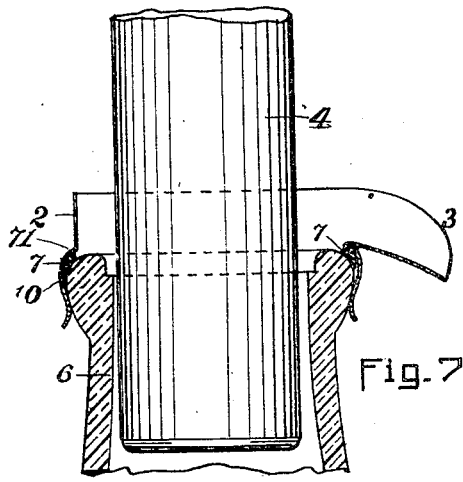
Figure 10:
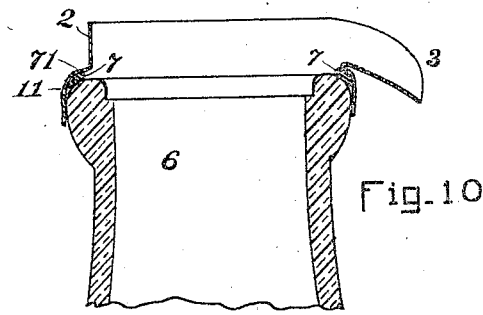
Figure 8:
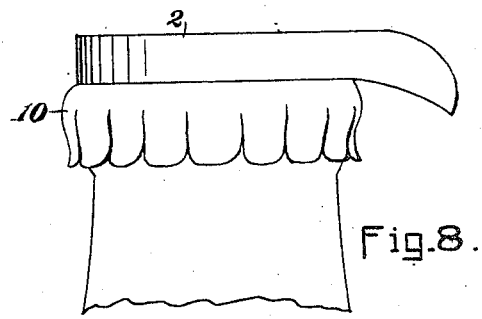
Figure 11:
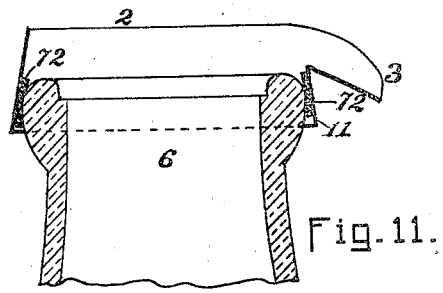
Figure 9:
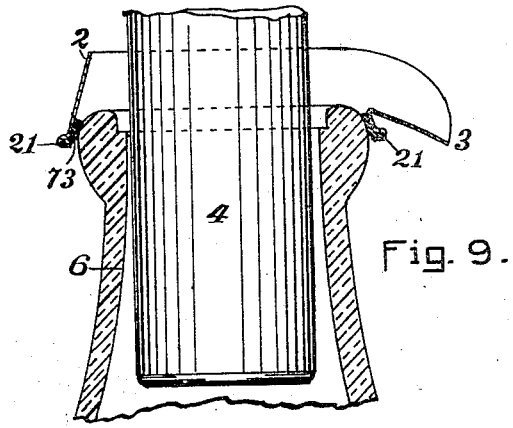

Figure 1 is a sectional elevation of a bottle and my device in place thereon. Fig. 2 is a plan view of the cap which is applied to the bottle. Fig. 3 is a front elevation of this cap or spout member of my device in the same construction as is shown in Figs. 1 and 2. Fig. 4 is a sectional elevation of a modified form applied to a bottle. Fig. 5 is a plan view of the form of device shown in Fig. 4. Fig. 6 is a sectional elevation of another form of construction shown in place on a bottle. Fig. 7 is a sectional elevation of another type of construction shown in place on a bottle. Fig. 8 is an elevation of the same, not in section. Fig. 9 is a sectional elevation of a modified form upon a bottle. Figs. 10 and 11 are sectional elevations of modified constructions shown upon a bottle.

The type of bottle with which I have shown my invention, is that type which has come into almost universal use for the delivery of milk in bottles, and this includes a very large percentage of all the milk which is delivered to the family trade. Such bottled milk, either due to the length of time since it was bottled, or to the treatment given the product before bottling, at the time of receipt by the consumer has a considerable accumulation of cream at the top, and it is often desired that this cream, or some part of it, be removable without diluting it with milk. To pour the cream from such a bottle without pouring off a considerable amount of milk, is impossible. By the use of my device it is possible to remove all, or as much as may be desired, of the cream without drawing with it any of the milk.

My device is composed of two parts, a cap or pouring member, which fits the top of the bottle, and a displacement plunger which will pass through said cap into the bottle. The cap should be so constructed that it will be possible to make a tight connection between it and the bottle, thereby preventing leakage of the cream between, and it should also have a depressed portion or spout at one side, through which the cream will be delivered in a single stream, where it may be caught in a receptacle provided for it.

The form of cap or spout member, as shown in Figs. 1, 2 and 3, has a neck 1, designed for fitting within the bottle neck and to make a tight joint therewith, without using a packing ring. To enable this neck to spring, as may be necessary to tightly fit necks which are not truly circular, it is desirable that the neck 1 be made of thin and springy metal. It is also desirable that this neck 1 be slightly coned, to thereby fit the bottle necks, if they vary somewhat in exactness of dimension. Secured to and forming a continuation of this neck 1, is a wall 2 which extends to a short distance above the top of the bottle. At one side this wall is bent down to form a spout 3, from which the cream will flow. The metal at this point may be extended farther than would be due to the height of the wall 2, if it is desired to have a longer spout. This is however, not essential. It is desirable that this spout be slightly inclined downward.

The type of construction shown in Figs. 4 and 5, differs from the above only in having the upwardly extending restraining wall curved backward toward the center in its upper portion. I have, however, shown a packing ring 7 as placed about the upper part or base of the cone formed by the neck 1, where it enters the recess in the bottle mouth in which the paper disk is placed when sealing the bottle. This expedient may be employed when desired and if found that the cap does not make a sufficiently tight joint with the bottle neck.

In Fig. 6 is shown a type of construction in which the restraining wall is like that shown in Fig. 1, but in which the neck 1 is replaced by a short neck 8, which terminates at its lower edge in a slight outward flange 9, a packing ring 7, of rubber, being placed in the groove thus formed. This plan of making a tight joint with the bottle may be applied to any and all the types shown in the preceding figures.

In Figs. 7 to 11, inclusive, I have shown modifications in which the sealing contact between the bottle and the cap is upon the exterior surface of the bottle. In the form shown in Figs. 7 and 8, the apron which extends downward over the bottle head is slit and designed to grip the head of the bottle and, by the spring action of the tongues 10, hold the cap securely in place. This has a rubber ring 7 seating just under the shoulder 71, whereby a tight joint is secured.

In the type shown in Fig. 9 the body thereof is large enough at its lower side, to pass over the bottle head and has a rubber ring 73, of a type resembling the rubber ring used for sealing the type of fruit jar which is commonly known as the "Mason" jar, secured by its outer edge in a seam crimped in the edge of the metal of which the cap is formed. This construction is capable of fitting tightly upon bottles of considerable variation in size.

The type shown in Fig. 10 is like that shown in Fig. 7, except that the apron is not slit into the tongues 10. The type shown in Fig. 11 resembles that shown in Fig. 9, except that the ring of rubber is more like a section of a tube and is cemented or placed within the tapering apron 11.

The displacement plunger which is to be used with each and all these types, may be constructed of any material found suitable for the purpose, although some materials and methods of construction will be found more desirable than others. The plunger 4 as shown, is intended to be made of metal, as a tube with its ends closed, or at least, one end closed. While this might be provided with one or more longitudinal grooves for the upward flow of the cream, I believe it to be, on the whole, more desirable to make it of true circular cross section, a little less in diameter than the hole in the cap. The length of this plunger should be such as will either remove all the cream, or extend into contact with the bottom of the bottle. As its outer surface is smooth and free of all seams, it may easily be cleaned perfectly and kept in absolutely sanitary condition. Among the materials which are well adapted for making this plunger are, seamless metal tubing, preferably of aluminum or of other metal plated with nickel, a seamed metal tube with ends closed and then coated with a fire-baked enamel, such for instance, as is used in making what is known as "granite ware;" or it may be made of glass tubing or solid glass, or earthen ware glazed.

In using my device, the cap is placed upon the bottle and pressed down so as to secure as tight a joint as necessary, a receptacle placed to receive the discharged cream and the plunger inserted and pressed slowly downward. As the cream is lighter than the milk and the insertion of the plunger does not stir up the contents of the bottle, the cream will flow out before the milk will come. As the plunger is inserted in the bottle the contents thereof are forced out, in an amount equal in volume to the volume of the plunger inserted in the bottle.

Both parts of this device are of a construction and material which may be thoroughly and easily cleansed and kept in sanitary condition. All surfaces are exposed and accessible for cleaning.

The cap may be made of thin metal, for which I prefer aluminum or, if made of iron or brass, that it be nickel plated. It is desirable that the neck 1 which enters the bottle, be of such thinness and resiliency, that it will spring under slight force, to conform to the inequalities of surface of the bottle mouth, thereby making a tight joint. While a tight joint may be secured by the use of a ring of rubber or other compressible material, I prefer to secure this, if possible, without using anything of this sort, as the device may be thus kept in more sanitary condition.

A material which might be used to advantage for making both parts of this device, is molded paper, preferably waterproofed in some manner. Such construction would be of a more temporary character and much less desirable from the standpoint of sanitation and durability, but otherwise it would be a very desirable material. They might also be made of celluloid or any other material which may be cheaply formed into the desired shape and which is not objectionable from a sanitary standpoint. Glass might be used to advantage in making the cap, for such constructions as engage the outer surface of the bottle, provided a packing ring may be employed for securing a tight joint. It would not be desirable for making the types which engage the inner surface of the bottle mouth, for the reason that their necessary thickness would consume too much of the space and forbid use of a plunger as large as is desirable. My invention, however, does not lie in the use of any special material.

What I claim as my invention and desire to patent is:

1. As an article of manufacture, a cap for application to the mouths of milk bottles to facilitate the removal of the cream, comprising a neck adapted to enter the bottle mouth and to form a sealing connection with an inner peripheral surface of said mouth, a flow-restraining wall extending upwardly and outwardly of said neck and bent down at one point to form a discharge spout.

2. As an article of manufacture, a cap for application to milk bottles for the removal of cream having a slightly tapering neck of resilient material adapted to enter the bottle mouth and to spring to form a sealing contact with an inner peripheral surface of the bottle mouth, and also having a flow-restraining wall extending upward and outward from said neck and bent down at one point to form a discharge spout.

3. A cream remover for bottled milk comprising a cap having a neck of tubular character adapted to enter the bottle mouth and to form a sealing contact with the bottle surfaces within said mouth and having side walls extending upward and outward from said neck to form a flow channel lying wholly outside said neck and freely opening upward, said wall at one side being depressed to form a discharge spout, and a displacement plunger insertible through said neck into the bottle.

In testimony whereof I have hereunto affixed my signature this 27th day of May, 1913.

HENRY L. REYNOLDS.

Witnesses:
JNO. W. COVER,
PENROSE L. MCELWAIN.